T. B. MATHIAS.
TIRE TOOL.
APPLICATION FILED OCT. 22, 1917.
1,271,919.
Patented July 9, 1918.
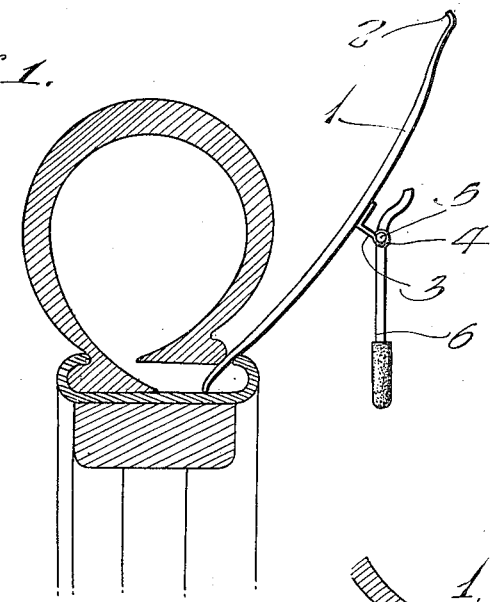
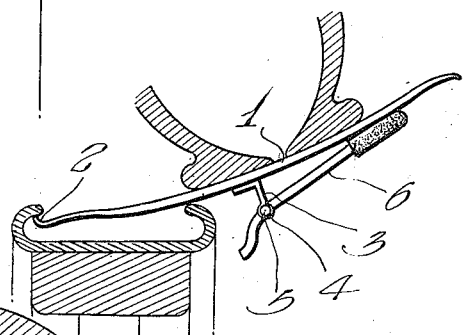
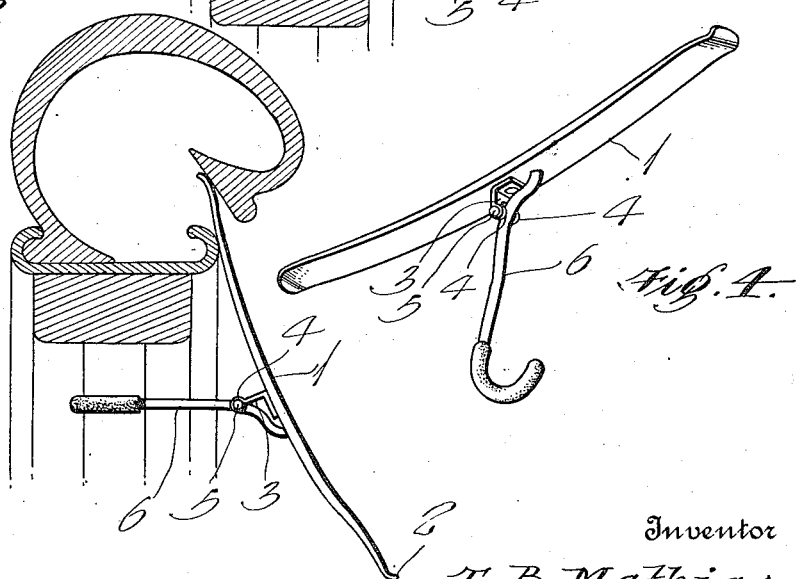
Witness
H. Woodard
Inventor
T. B. Mathias

UNITED STATES PATENT OFFICE.

THADDEUS B. MATHIAS, OF DENVER, COLORADO.

TIRE-TOOL.

1,271,919.	Specification of Letters Patent.	Patented July 9, 1918.

Application filed October 22, 1917. Serial No. 197,904.

*To all whom it may concern:*

Be it known that I, THADDEUS B. MATHIAS, a citizen of the United States, residing at 2916 W. 32d Ave., Denver, in the county of Denver and State of Colorado, have invented certain new and useful Improvements in Tire-Tools; and I declare the following to be a full, clear, and exact description of the invention, such as will enable others skilled in the art to which it appertains to make and use the same.

This invention relates generally to motor vehicle accessories, and more particularly to certain new and useful improvements in tools which are used in applying and removing tires from their rims.

The primary object of the invention is to provide a tool which is to be used in prying a tire off of its rim, and which is provided with a means for engagement with the wheel for maintaining it in operative position.

Another object of the invention is to provide a tire removing tool of this character which can be easily manipulated with one hand, the means which engages the wheel for holding the tool in operative position automatically swinging in position for such engagement when the tire has been pried from under the edge of the rim.

With these and numerous other objects in view, the invention consists of certain novel features of construction, and the combination and arrangement of parts as will be hereinafter described and claimed.

In the accompanying drawings, forming a part of the application, and in which similar reference characters are used to designate like parts throughout the several views:—

Figure 1 is a cross sectional view of a tire and rim, showing a device constructed in accordance with this invention in its first position for removing the tire from the rim;

Fig. 2 is a similar view showing the device in its second position;

Fig. 3 is a similar view showing the manner in which the device is used in applying a tire to a rim; and Fig. 4 is an enlarged perspective view of the device.

Referring more particularly to the drawings, the numeral 1 designates a bar made of substantially flat material. This bar 1 is preferably curved longitudinally and is thicker at its middle portion than at its ends. The ends of the bar 1 are rounded as shown and one end is provided with a laterally extending lip 2.

Secured to one side of the bar 1 at a position substantially mid-way of the ends thereof is a lug 3. This lug 3 extends laterally from the bar and is provided at its outer end with a pair of spaced wings 4 which are bent into circular shape to provide pivot bearings, having apertures to receive a pin 5 which extends transversely through a rigid rod 6 near one end of the latter.

The rod 6 is bent laterally at the point at which the pin 5 extends through the same, and this bent portion is adapted to engage the adjacent side of the bar 1 when the rod is extending substantially laterally with respect to the same to hold it in this position. The other end of the rod 6 is bent into hook shape and covered with rubber or other cushioning material to prevent marring of the spokes of the wheel with which it is to become engaged.

In using the device to remove the tire from a rim, one end of the bar 1 is inserted between the hooked edge of the rim and the tire until the tire is pried from under this edge. The bar is held in substantially an upright position while this is being done. It is then swung downwardly using the edge of the rim as a fulcrum, thus moving the edge of the tire beyond the edge of the rim. As the bar 1 is moved downwardly the rod 6 will swing into its laterally extending position with respect to the bar, and the hook may be readily engaged with the adjacent spoke of the wheel to hold the bar in this position. The remaining portions of the tire may be similarly disengaged from the rim by using another or other tools constructed the same as above described.

In Fig. 3 of the drawings the manner in which the device is used to apply a tire to a rim is shown. In this case, the bar 1 is extended transversely across the rim and the lip 2 is hooked under one edge of the rim. The tire may then be slid down the adjacent side of the bar and in place on the rim.

When the device is not in use the rod 6 may be swung alongside of the bar 1 and readily packed away in a tool box or the like.

The device may be manipulated with one hand when prying the tire from a rim and engaging the hook with the spoke of the wheel for maintaining the bar in its operative position. This is made possible by the provision of the laterally extended end portion which rests against the bar or lever 1 and supports the hook-bar 6 in the position shown in Fig. 2, so that when the operator has inserted one end of the lever 1 under the edge of the tire and thereby raised the latter as shown in Fig. 2, the hook-bar 6 is supported in a substantially horizontal position, and the operator may cause the hook to engage with a spoke of the wheel by simply moving the end 2 of the lever laterally, without the necessity of using the other hand in connection with this tool.

From the foregoing description taken in connection with the accompanying drawings the construction, use and operation of the device will be readily understood without a more extended explanation.

As various changes in form, proportion, and in the minor details of construction may be resorted to without departing from the spirit of this invention, it is to be understood that I do not wish to be limited to the construction herein shown and described other than as claimed.

I claim:

A tire-tool comprising a relatively wide and thin bar whose thickness is greater at the middle than at the ends, said ends being curved from edge to edge and being turned laterally in opposite directions; a bifurcated apertured lug extending laterally from the middle of one of the major sides of said bar; a second bar, said second bar being formed with a hook at one end and having its other end portion extending laterally in a direction at an angle to the plane of the hook, said second bar having a portion adjacent to said laterally extended end portion and disposed between the furcations of said lug, a pivot extending through the apertures of said lug and through said bar and having its axis parallel with the plane of said hook; and cushioning means on said hook.

In testimony whereof I have hereunto set my hand in the presence of two subscribing witnesses.

THADDEUS B. MATHIAS.

Witnesses:
J. H. DANA,
ANNIE MEIKLEHAM.